(12) United States Patent
Nakano et al.

(10) Patent No.: US 7,859,822 B2
(45) Date of Patent: Dec. 28, 2010

(54) MONOLITHIC CERAMIC CAPACITOR

(75) Inventors: Makito Nakano, Yasu (JP); Akira Saito, Ritto (JP)

(73) Assignee: Murata Manufacturing Co., Ltd., Nagaokakyo-shi, Kyoto-fu (JP)

( * ) Notice: Subject to any disclaimer, the term of this patent is extended or adjusted under 35 U.S.C. 154(b) by 352 days.

(21) Appl. No.: 11/889,556

(22) Filed: Aug. 14, 2007

(65) Prior Publication Data

US 2008/0013252 A1 Jan. 17, 2008

Related U.S. Application Data

(63) Continuation of application No. PCT/JP2006/301724, filed on Feb. 2, 2006.

(30) Foreign Application Priority Data

Mar. 14, 2005 (JP) ............................. 2005-070348

(51) Int. Cl.
*H01G 4/06* (2006.01)
*H01G 4/005* (2006.01)

(52) U.S. Cl. ...................... 361/311; 361/303

(58) Field of Classification Search ................. 361/303, 361/311, 313

See application file for complete search history.

(56) References Cited

U.S. PATENT DOCUMENTS 4,574,329 A * 3/1986 Eijkelenkamp et al. .. 361/321.2

FOREIGN PATENT DOCUMENTS

| JP | 2-086109 | | 3/1990 |
| JP | 3-136308 | | 6/1991 |
| JP | 03136308 A | * | 6/1991 |
| JP | 06-243725 A | | 9/1994 |
| JP | 9-148175 | | 6/1997 |
| JP | 9-320887 | | 12/1997 |
| JP | 11340083 A | * | 12/1999 |
| JP | 2004-149341 A | | 5/2004 |

OTHER PUBLICATIONS

English Translation of JPO Action dated Nov. 24, 2009.
Written Opinion of the International Searching Authority dated May 16, 2006.

* cited by examiner

*Primary Examiner*—Eric Thomas
(74) *Attorney, Agent, or Firm*—Dickstein Shapiro LLP

(57) ABSTRACT

A capacitor body includes a capacitance-forming section including an alternately arranged plurality of internal electrodes and plurality of dielectric ceramic layers and outer layer sections disposed on the upper or lower face of the capacitance-forming section (28). The outer layer sections include an outermost layer and a second layer (31) inwardly located therefrom. The second layer has a thermal expansion coefficient greater than that of the outermost layer by $1 \times 10^{-6}/°C$. to $3 \times 10^{-6}/°C$. The outermost layer has a thickness of 50 to 80 μm. The second layer has a thickness of 20 to 50 μm. The arrangement prevents cracks from being formed in a monolithic ceramic capacitor when external electrodes are formed by baking and cooling, and cracks caused by fatigue failure due to low-stress cycles such as heat cycles are prevented from reaching internal electrodes.

12 Claims, 3 Drawing Sheets

PRIOR ART

MONOLITHIC CERAMIC CAPACITOR

This is a continuation of application Ser. No. PCT/JP2006/301724, filed Feb. 2, 2006.

TECHNICAL FIELD

The present invention relates to monolithic ceramic capacitors and particularly relates to the configuration of outer layer sections which are portions of a capacitor body included in a monolithic ceramic capacitor and which includes no internal electrode.

BACKGROUND ART

FIG. 5 shows the configuration of a monolithic ceramic capacitor relating to the present invention.

With reference to FIG. 5, the monolithic ceramic capacitor 1 includes a capacitor body 2, a first outer electrode 3, and a second outer electrode 4. The first and second outer electrodes 3 and 4 are disposed on opposed end faces of the capacitor body 2. The capacitor body 2 includes a capacitance-forming section 8 and outer layer sections 9 disposed on each of the upper or lower face of the capacitance-forming section 8. The capacitance-forming section 8 includes a plurality of internal electrodes 5 and 6 and a plurality of dielectric ceramic layers 7. The internal electrodes 5 and 6 and the dielectric ceramic layers 7 are alternately arranged.

The internal electrodes 5 and 6 are categorized into first internal electrodes 5 and second internal electrodes 6. Each first internal electrode 5 and each second internal electrode 6 are paired to form a capacitance therebetween. The first internal electrodes 5 are electrically connected to the first outer electrode 3 and the second internal electrodes 6 are electrically connected to the second outer electrode 4.

In the monolithic ceramic capacitor 1, the dielectric ceramic layers 7 and outer layer sections 9 disposed in the capacitance-forming section 8 are usually made of the same dielectric ceramic material.

The monolithic ceramic capacitor 1 is manufactured as follows: the capacitor body 2 which is unfired and which includes the internal electrodes 5 and 6, the dielectric ceramic layers 7, and the outer layer sections 9 are prepared and then fired; a conductive paste is applied onto both end faces of the fired capacitor body 2; and the first and second outer electrodes 3 and 4 are formed by baking the resulting conductive paste.

In the monolithic ceramic capacitor 1, the thermal expansion coefficient of the dielectric ceramic material, which is used for forming the dielectric ceramic layers 7 and the outer layer sections 9, is different from that of the internal electrodes 5 and 6 and that of the outer electrodes 3 and 4. Therefore, a residual stress is generated in the capacitor body 2 during the firing step for sintering the capacitor body 2 and also in the baking step for forming the outer electrodes 3 and 4. In particular, a tensile stress 11 is concentrated on an end portion 10 of each of the outer electrodes 3 and 4 as indicated by a dotted arrow in FIG. 5.

Under these circumstances, if a stress is generated in the capacitor body 2 by an external factor such as mounting, the cyclic application of heat or the warpage of a wiring board (not shown) on which the monolithic ceramic capacitor 1 is mounted, the stress is applied to the end portion 10 of each of the outer electrodes 3 and 4 in addition to the tensile stress 11; hence, cracks are formed in the end portion 10. The cracks extend from the end portion 10 in the direction indicated by an arrow 12.

Patent Documents 1 and 2 disclose techniques in which the formation of such cracks is prevented by improving the configuration of outer layer sections 9.

In particular, Patent Document 1 discloses that a dielectric ceramic material for forming these outer layer sections 9 has a thermal expansion coefficient that is $0.2 \times 10^{-6}/°$ C. to $1 \times 10^{-6}/°$ C. less than that of the dielectric ceramic material used for forming dielectric ceramic layers 7 included in capacitance-forming section 8 and these outer layer sections 9 have a thickness of 20 to 200 µm. In this configuration, these outer layer sections 9 have a thermal expansion coefficient less than that of this capacitance-forming section 8; hence, the compressive stresses applied to these outer layer sections 9 and the compressive stresses applied to end portions of outer electrode 3 and 4 are increased by the shrinkage of the capacitance-forming section 8 due to cooling. This prevents the formation of cracks.

Patent Document 2 discloses that the outermost layer of each outer layer section 9 is made of a dielectric ceramic material with high mechanical strength and a second layer located inside the outermost layer is porous. In this configuration, the second layer absorbs the difference in shrinkage between the outermost layer of the outer layer section 9 and a capacitance-forming section 8 and the formation of cracks is prevented by the outermost layer, which has high a mechanical strength.

According to the technique disclosed in Patent Document 1, the difference in thermal expansion coefficient between the outer layer sections 9 and the outer electrodes 3 and 4 is large and the tensile stress 11 applied to the end portion 10 of each of the outer electrodes 3 and 4 is large. This can cause cracks.

Even in the techniques disclosed in Patent Documents 1 and 2, low-stress cycles such as heat cycles can cause fatigue failure, which causes cracks. These cracks can propagate in the outer layer sections 9 to reach the internal electrodes 5 and 6 as indicated by the arrow 12 in FIG. 5. This causes short circuits and/or property deterioration such as a reduction in capacitance in the monolithic ceramic capacitor 1.

Patent Document 1: Japanese Unexamined Patent Application Publication No. 3-136308

Patent Document 2: Japanese Unexamined Patent Application Publication No. 2-86109

DISCLOSURE OF INVENTION

Problems to be Solved by the Invention

It is an object of the present invention to provide a monolithic ceramic capacitor capable of solving the above problems.

Means for Solving the Problems

The present invention provides a monolithic ceramic capacitor including a capacitor body, a first outer electrode, and a second outer electrode, the first and second outer electrodes being disposed on different surface portions of the capacitor body. The capacitor body includes a capacitance-forming section including a plurality of internal electrodes and a plurality of dielectric ceramic layers and also includes outer layer sections each disposed on the upper or lower face of the capacitance-forming section. The internal electrodes and the dielectric ceramic layers are alternately arranged. The internal electrodes are categorized into first internal electrodes and second internal electrodes. Each first internal electrode and each second internal electrode are paired to form a capacitance therebetween. The first internal electrodes are electrically connected to the first outer electrode and the second internal electrodes are electrically connected to the second outer electrode. In order to solve the above problems, the monolithic ceramic capacitor has the configuration described below.

The outer layer sections each include an outermost layer and a second layer located inside the outermost layer. The second layer has a thermal expansion coefficient greater than that of the outermost layer. The difference between the thermal expansion coefficient of the second layer and that of the outermost layer is within the range of $1 \times 10^{-6}/°C$ to $3 \times 10^{-6}/°C$. The outermost layer has a thickness of 50 to 80 µm and the second layer has a thickness of 20 to 50 µm.

In the monolithic ceramic capacitor, the second layer may be next to the capacitance-forming section or the outer layer sections may each further include a third layer located between the second layer and the capacitance-forming section. The third layer and the outermost layer may be made of the same material.

In the monolithic ceramic capacitor, it is preferable that the outermost layer and the second layer be made of $BaTiO_3$ dielectric ceramic materials and the thermal expansion coefficient of the outermost layer or the second layer is adjusted in such a manner that some of the Ba ions in one of the $BaTiO_3$ dielectric ceramic materials are replaced with Ca ions.

Advantages

In a cooling step subsequent to the step of forming the external electrodes by baking, tensile stresses are concentrated on regions near end portions of the external electrodes because of the difference in the thermal expansion coefficients between the outermost layers and the external electrodes. In the monolithic ceramic capacitor according to the present invention, the second layers shrink more than the outermost layers during the cooling step; hence, relatively large compressive stresses are applied to the outermost layers. The compressive stresses counteract the tensile stresses concentrated on the regions near the external electrode end portions. Therefore, cracks can be prevented from being formed in the regions near the external electrode end portions.

Although the formation of such cracks is prevented by the compressive stresses, other cracks can be caused by fatigue failure due to low-stress cycles such as heat cycles. These cracks propagate in the outer layer sections and then may reach the internal electrodes.

In order to avoid the above problem, the thermal expansion coefficient of the outermost layers, and the thermal expansion coefficient of the second layers, the thickness range of the outermost layers, and the thickness range of the second layers are specified to be within the above ranges. When within these ranges, any cracks formed are forced to bend in a direction away from the internal electrodes because of the compressive stresses applied to the outermost layers by the shrinkage of the second layers. Accordingly, problems such as a short circuit or a reduction in capacitance can be prevented from occurring in the monolithic ceramic capacitor.

Figure 1:
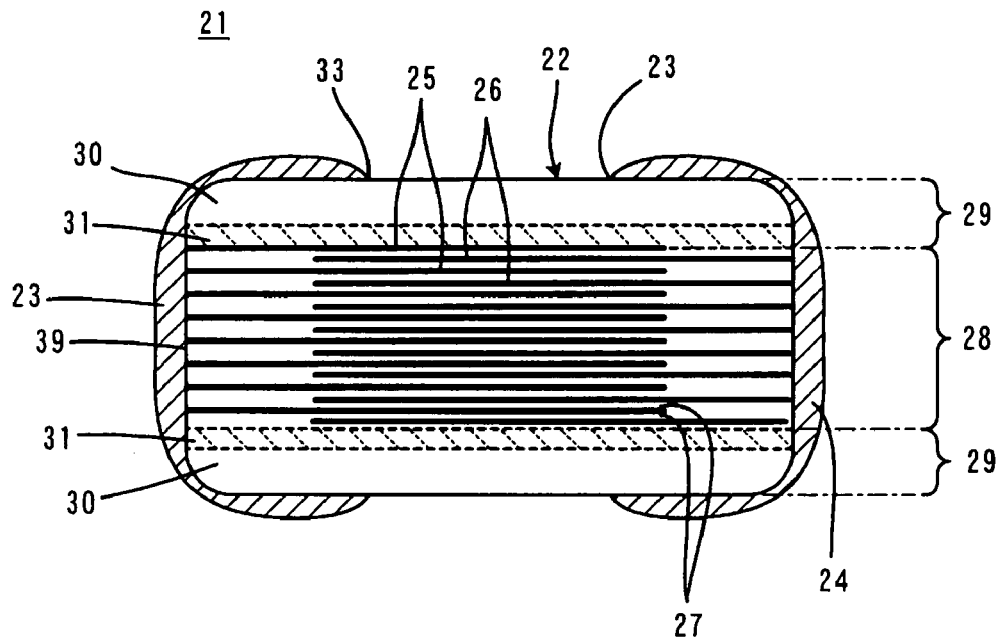
FIG. 1 is a sectional view of a monolithic ceramic capacitor 21 according to a first embodiment of the present invention.

REFERENCE NUMERALS 21 and 41 monolithic ceramic capacitors
22 capacitor body
23 and 24 outer electrodes
25 and 26 internal electrodes
27 dielectric ceramic layers
28 capacitance-forming section
29 outer layer sections
30 outermost layers
31 second layers
32 tensile stress
33 end portion of an external electrode
36 compressive stress
37 and 38 arrows each indicating the propagation direction of a crack
42 third layers

BEST MODE FOR CARRYING OUT THE INVENTION

FIG. 1 is a sectional view of a monolithic ceramic capacitor 21 according to a first embodiment of the present invention.

With reference to FIG. 1, the monolithic ceramic capacitor 21 includes a capacitor body 22, a first outer electrode 23, and a second outer electrode 24. The first and second outer electrodes 23 and 24 are disposed on different surface portions of the capacitor body 22, for example, opposed end portions of the capacitor body 22. The capacitor body 22 includes a capacitance-forming section 28 and outer layer sections 29 disposed on each of the upper or lower face of the capacitance-forming section 28. The capacitance-forming section 28 includes a plurality of internal electrodes 25 and 26 and a plurality of dielectric ceramic layers 27. The internal electrodes 25 and 26 and the dielectric ceramic layers 27 are alternately arranged.

The internal electrodes 25 and 26 are categorized into first internal electrodes 25 and second internal electrodes 26. Each first internal electrode 25 and each second internal electrode 26 are paired to form a capacitance therebetween. The first internal electrodes 25 are electrically connected to the first outer electrode 23 and the second internal electrodes 26 are electrically connected to the second outer electrode 24.

Figure 5:
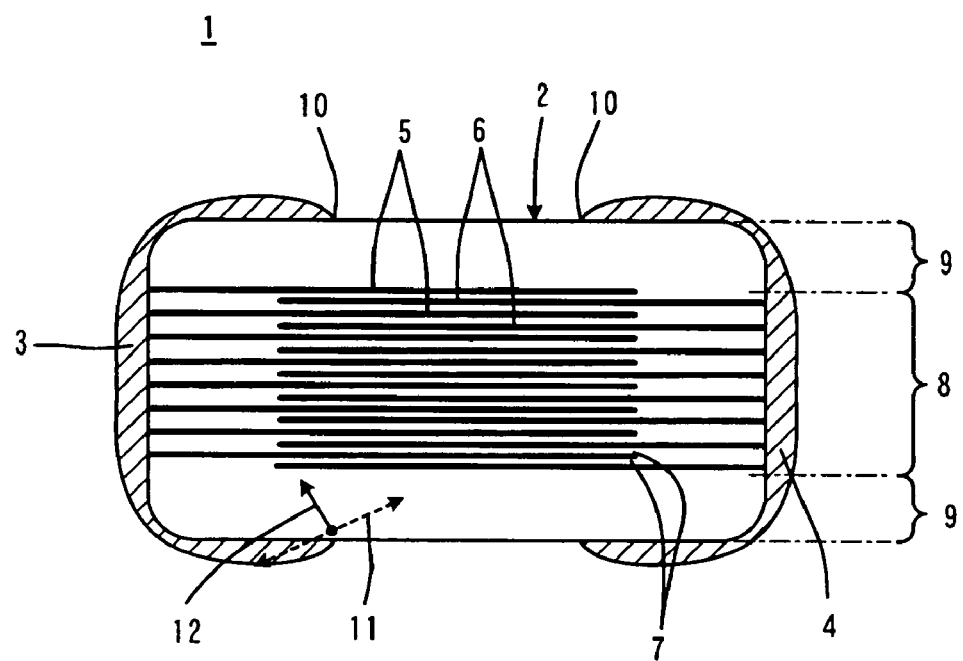
FIG. 5 is a sectional view of a conventional monolithic ceramic capacitor relating to the present invention.

This configuration is similar to that of the conventional monolithic ceramic capacitor 1 shown in FIG. 5. Features of this embodiment will now be described.

The outer layer sections 29 each include an outermost layer 30 and a second layer 31 located inside the second layer 31. For the distinction from other layers, the second layers 31 are hatched with broken lines in FIG. 1 and figures.

The thermal expansion coefficient of the second layers 31 is greater than the thermal expansion coefficient of the outermost layers 30 and the difference between these thermal expansion coefficients is within the range of $1 \times 10^{-6}/°C$ to $3 \times 10^{-6}/°C$.

The outermost layers 30 and second layers 31 of the outer layer sections 29 are preferably made of the same type of dielectric ceramic materials. In order to allow the outermost layers 30 and the second layers 31 to have different thermal expansion coefficients although they are made of the same type of dielectric ceramic materials, a technique described below is preferably used.

When the outermost layers 30 and the second layers 31 are made of the same type of $BaTiO_3$ dielectric ceramic materials, the thermal expansion coefficient of the outermost layers 30 or the second layers 31 is preferably adjusted by replacing some of Ba ions in one of the $BaTiO_3$ dielectric ceramic materials with Ca ions such that a large thermal expansion coefficient can be achieved.

The outermost layers 30 have a thickness of 50 to 80 µm. The second layers 31 have a thickness of 20 to 50 µm.

Figure 2:
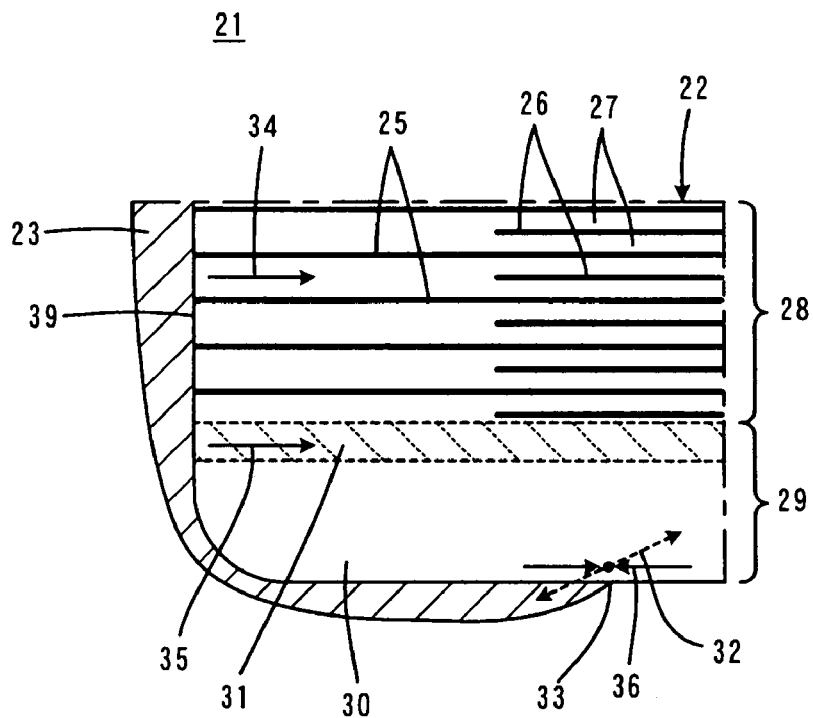
FIG. 2 is an enlarged view of a portion of the monolithic ceramic capacitor 21 shown in FIG. 1 and illustrates that a compressive stress 36 counteracts a tensile stress 32.
Figure 3:
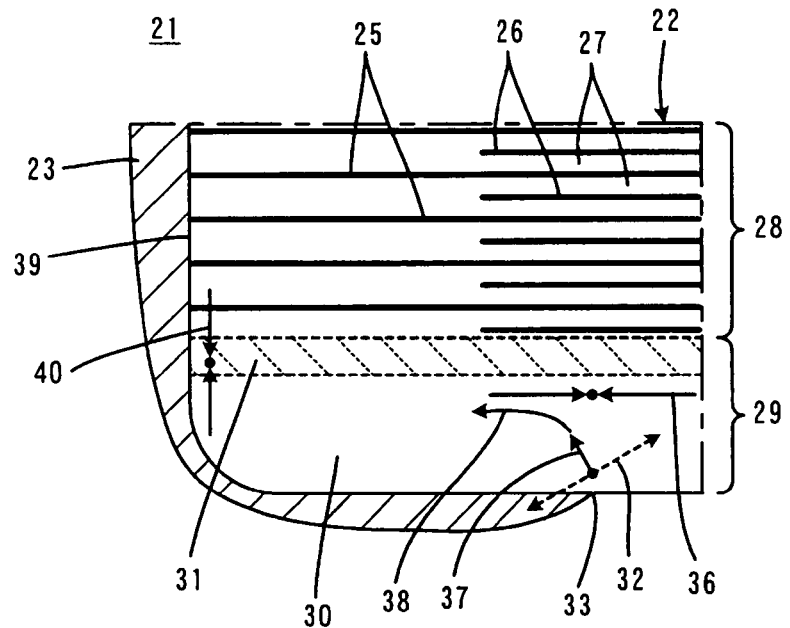
FIG. 3 is an enlarged view of a portion of the monolithic ceramic capacitor 21 shown in FIG. 1 and illustrates the propagation direction of a crack caused by a tensile stress 32.

The monolithic ceramic capacitor 21 has the above features and therefore has advantages described below. FIGS. 2 and 3 illustrate such advantages and show portions of the monolithic ceramic capacitor 21 in an enlarged manner.

During cooling subsequent to the baking step for forming the outer electrodes 23 and 24, a tensile stress 32 is concentrated on an end portion 33 of each of the outer electrodes 23 and 24 as indicated by a dotted arrow in FIG. 2 because of the difference in thermal expansion coefficient between the outermost layer 30 of each outer layer section 29 and the outer electrodes 23 and 24.

Since the thermal expansion coefficient of the internal electrodes 25 and 26 is greater than that of the outer layer sections 29, the capacitance-forming section 28 shrinks more than the outer layer sections 29 during the cooling step. The shrinkage 34 of the capacitance-forming section 28 leads to the shrinkage 35 of each outer layer section 29; hence, a compressive stress 36 indicated by opposed arrows is applied to the whole outer layer section 29.

Since the relationship between the thermal expansion coefficient of each outermost layer 30 and that of each second layer 31 is as described above, the second layer 31 shrinks more than the outermost layer 30 in the cooling step. Hence, the compressive stress 36 applied to the outermost layer 30 is relatively large. The compressive stress 36 counteracts the tensile stress 32 concentrated on the end portion 33 of each of the outer electrodes 23 and 24. This prevents the tensile stress 32 from causing cracks.

Although the formation of such shrinkage cracks can be prevented, the tensile stress 32 can still cause a crack because low-stress cycles such as heat cycles cause fatigue failure. The crack propagates in the direction indicated by an arrow 37 in FIG. 3. According to this embodiment, the relationship between the thermal expansion coefficient of the outermost layer 30 and that of the second layer 31 is set as described above and the thickness of the outermost layer 30 and that of the second layer 31 are selected as described above. Therefore, although the crack, which propagates in the direction indicated by the arrow 37 is formed, as shown in FIG. 3, the crack is curved as indicated by an arrow 38 because of the compressive stress 36 applied to the outermost layer 30 by the large shrinkage of the second layer 31. This prevents the crack from reaching one of the internal electrodes 25 and 26. Therefore, the monolithic ceramic capacitor 21 can be prevented from suffering from short circuits and/or property deterioration such as a reduction in capacitance.

The reason why the difference between the thermal expansion coefficient of the outermost layer 30 and that of the second layer 31 is within a range of $1 \times 10^{-6}$/° C. to $3 \times 10^{-6}$/° C. is as follows. When the difference between these thermal expansion coefficients is less than $1 \times 10^{-6}$/° C., the compressive stress 36 applied to the outermost layer 30 is insufficient to force the crack to bend as indicated by the arrow 38. When the difference therebetween is greater than $3 \times 10^{-6}$/° C., the compressive stress 36 applied to the outermost layer 30 is excessively large and therefore the crack reaches a region near an end portion 39 of the capacitor body 22. The shrinkage of the outer electrodes 23 and 24 applies a compressive stress 40 to the end portion 39. This causes the crack to propagate toward the internal electrodes 25 and 26.

The reason why the thickness of the outermost layer 30 is selected to be within a range of 50 to 80 µm is as follows. When the thickness thereof is less than 50 µm, the thickness thereof is insufficient to force the crack to bend as indicated by the arrow 38; hence, the crack reaches the second layer 31 and can propagates through the second layer 31 to reach one of the internal electrodes 25 and 26. When the thickness thereof exceeds 80 µm, the compressive stress 36 applied to the outermost layer 30 is insufficient to force the crack to bend as indicated by the arrow 38.

The reason why the thickness of the second layer 31 is selected to be within a range of 20 to 50 µm that is when the thickness thereof is outside this range, the compressive stress 36 applied to the outermost layer 30 is insufficient to force the crack to bend as indicated by the arrow 38.

Figure 4:
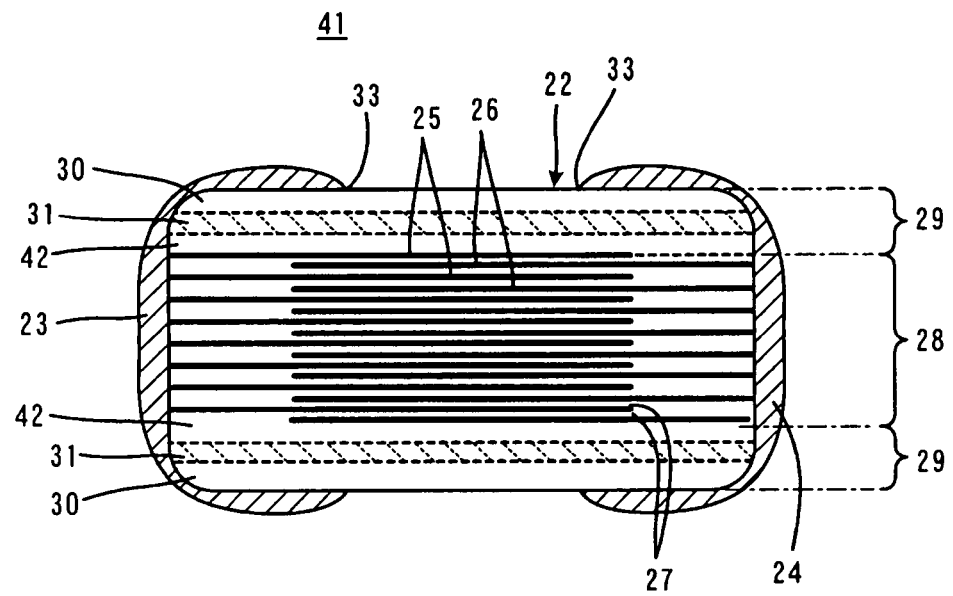
FIG. 4 is a sectional view of a monolithic ceramic capacitor 41 according to a second embodiment of the present invention.

FIG. 4 is a sectional view of a monolithic ceramic capacitor 41 according to a second embodiment of the present invention. The same components in FIG. 4 as those in FIG. 1 have the same reference numerals as those in FIG. 1 and will not be described in detail.

In the monolithic ceramic capacitor 21 of the first embodiment, the second layers 31 of the outer layer sections 29 are next to the capacitance-forming section 28. With reference to FIG. 4, the monolithic ceramic capacitor 41 of the second embodiment includes a capacitance-forming section 28 and outer layer sections 29 each including an outermost layer 30, a second layer 31, and have a third layer 42 located between the second layer 31 and this capacitance-forming section 28. The third layer 42 and the outermost layer 30 are made of substantially the same material.

In the second embodiment, the outermost layer 30 has a thickness of 50 to 80 µm and the second layer 31 may be located at any portion of one or both of the outer layer sections 29.

Experiments performed to confirm advantages of the present invention will now be described.

In the experiments, monolithic ceramic capacitors each including the following components were prepared: a capacitor body with a size of 1.0 mm×0.5 mm×0.5 mm, dielectric ceramic layers with a thickness of 7.4 µm, internal electrodes with a thickness of 1.3 µm, and outer layer sections with a thickness of 100 µm. A conductive paste containing a conductive component such as nickel was used to form the internal electrodes. In order to prepare the capacitor body, the conductive paste was fired together with the dielectric ceramic layers and the outer layer sections. A conductive paste containing a conductive component such as copper was used to form the outer electrodes. This conductive paste was applied to both end faces of the fired capacitor body and then baked.

Dielectric ceramic materials principally containing $BaTiO_3$ were used to form the dielectric ceramic layers. The dielectric ceramic materials had a thermal expansion coefficient of $11 \times 10^{-6}$/° C. at a temperature of 25° C. to 800° C.

Table 1 shows the thermal expansion coefficient and thickness of the outer layer sections of the monolithic ceramic capacitor samples prepared in the experiments. The thermal expansion coefficient thereof was determined at a temperature of 25° C. to 800° C.

TABLE 1

| Samples | Thermal expansion coefficient ($\times 10^{-6}/°C$) | | | Difference between second layer and outermost layer | Thickness (μm) | | | Stress relaxation (%) | Crack bending |
|---|---|---|---|---|---|---|---|---|---|
| | Outermost layers | Second layers | Third layers | | Outermost layers | Second layers | Third layers | | |
| 1 | 11 | 13 | — | 2 | 60 | 40 | — | 74 | A |
| 2 | 11 | 12 | — | 1 | 60 | 40 | — | 86 | B |
| 3 | 11 | 14 | — | 3 | 60 | 40 | — | 63 | B |
| 4 | 11 | 13 | — | 2 | 80 | 20 | — | 87 | B |
| 5 | 11 | 13 | — | 2 | 50 | 50 | — | 68 | B |
| *6 | 11 | 11.5 | — | 0.5 | 60 | 40 | — | 88 | C |
| *7 | 11 | 15 | — | 4 | 60 | 40 | — | 51 | C |
| *8 | 11 | 13 | — | 2 | 90 | 20 | — | 92 | C |
| *9 | 11 | 13 | — | 2 | 40 | 60 | — | 62 | C |
| *10 | 11 | 13 | — | 2 | 80 | 10 | — | 94 | C |
| 11 | 11 | 13 | — | 2 | 80 | 50 | — | 87 | B |
| *12 | 11 | 13 | — | 2 | 80 | 60 | — | 87 | C |
| 13 | 11 | 14 | 11 | 3 | 60 | 20 | 20 | 79 | A |
| *14 | 11 | | | — | 100 | | | 100 (standard) | C |
| *15 | 10 | | | — | 100 | | | 90 | C |

In Table 1, the samples with an asterisk are outside the scope of the present invention.

In Table 1, the outermost layers having a thermal expansion coefficient of $11 \times 10^{-6}/°C$ are made of a dielectric ceramic material principally containing $BaTiO_3$, the second layers having a thermal expansion coefficient of $11.5 \times 10^{-6}/°C$ are made of a dielectric ceramic material principally containing $Ba_{0.97}Ca_{0.03}TiO_3$, the second layers having a thermal expansion coefficient of $12 \times 10^{-6}/°C$ are made of a dielectric ceramic material principally containing $Ba_{0.95}Ca_{0.05}TiO_3$, the second layers having a thermal expansion coefficient of $13 \times 10^{-6}/°C$ are made of a dielectric ceramic material principally containing $Ba_{0.9}Ca_{0.1}TiO_3$, the second layers having a thermal expansion coefficient of $14 \times 10^{-6}/°C$ are made of a dielectric ceramic material principally containing $Ba_{0.86}Ca_{0.14}TiO_3$, and the second layers having a thermal expansion coefficient of $15 \times 10^{-6}/°C$ are made of a dielectric ceramic material principally containing $Ba_{0.82}Ca_{0.18}TiO_3$.

Samples 14 and 15 that were prepared as comparative examples include outer layer sections having a single-layer structure. Sample 15 includes outermost layers which have a thermal expansion coefficient of $10 \times 10^{-6}/°C$ and which were prepared from a mixture of $CaZrO_3$ and $BaTiO_3$ disclosed in Patent Document 1 in such a manner that the content of $CaZrO_3$ in the mixture was adjusted such that the thermal expansion coefficient was obtained.

The samples were evaluated for stress relaxation and crack bending as shown in Table 1.

The stress relaxation of each sample was determined by calculating the stress applied to an end portion of each outer electrode during the temperature change from 800° C. to 25° C. by a finite element method and the value obtained was normalized on the basis of the stress relaxation of Sample 14. The smaller the stress relaxation, the smaller the stress. A reduction in stress relaxation prevents the formation of cracks.

The crack bending of the sample was evaluated by subjecting the capacitor body of the sample to a heat cycle test in which the capacitor body was 2000 times repeatedly cooled to −55° C. and then heated to 125° C., the resulting capacitor body was polished, and the shape of a crack in the capacitor body was then visually observed. In Table 1, a rating of A and a rating of B both mean that a crack bends properly and therefore does not reach any internal electrode. In particular, a rating of A means that a crack extends near the interface between the outermost layer and the second layer and the distance between the crack and the interface therebetween is 10 μm or more. A rating of B means that the distance between the crack and the interface between an outermost layer and a second layer is less than 10 μm. A rating of C means that a crack reaches an internal electrode.

As shown in Table 1, Samples 1 to 5, 11 and 13 that are within the scope of the present invention have a stress relaxation of 63% to 87%; hence, the stress applied to an end portion of each of the outer electrodes of these samples is small. This prevents the formation of cracks. Comparisons in stress relaxation between Samples 1 to 5, 11 and 13 show that the stress relaxation is inversely proportional to the difference in thermal expansion coefficient between the second layer and the outermost layer and the thickness of the second layer and is proportional to the thickness of the outermost layer.

The evaluation of Samples 1 to 5, 11 and 13 for crack bending shows that any cracks caused by fatigue due to low-stress cycles such as heat cycles do not reach the internal electrodes of these samples. This prevents the degradation of properties of the monolithic ceramic capacitors.

The difference in thermal expansion coefficient, the outermost layer thickness and the second layer thickness characterize the present invention. Grounds for limiting these characteristics will now be described.

Table 2 shows some of the samples shown in Table 1. The samples shown in Table 2 have the same outermost layer thickness and the same second layer thickness and are arranged in order of the difference in thermal expansion coefficient.

TABLE 2

| Difference in thermal expansion coefficient ($\times 10^{-6}$/° C.) | Samples | Crack bending |
|---|---|---|
| 0.5 | * 6 | C |
| 1 | 2 | B |
| 2 | 1 | A |
| 3 | 3 | B |
| 4 | * 7 | C |

Table 2 illustrates that in order to ensure the good evaluation of crack bending, that is, in order to prevent cracks from reaching the internal electrodes of these samples, the difference in thermal expansion coefficient needs to be within a range of $1\times10^{-6}$/° C. to $3\times10^{-6}$/° C.

Table 3 shows some of the samples shown in Table 1. The samples shown in Table 3 have the same difference in thermal expansion coefficient and the same second layer thickness and are arranged in order of the outermost layer thickness.

TABLE 3

| Thickness of outermost layers (μm) | Samples | Crack bending |
|---|---|---|
| 40 | * 9 | C |
| 50 | 5 | B |
| 60 | 1 | A |
| 80 | 4 | B |
| 90 | * 8 | C |

Table 3 illustrates that in order to ensure the good evaluation of crack bending, that is, in order to prevent cracks from reaching the internal electrodes of these samples, the outermost layer thickness needs to be within a range of 50 to 80 μm.

Table 4 shows some of the samples shown in Table 1. The samples shown in Table 4 have the same difference in thermal expansion coefficient and the same outermost layer thickness and are arranged in order of the second layer thickness.

TABLE 4

| Thickness of second layers (μm) | Samples | Crack bending |
|---|---|---|
| 10 | * 10 | C |
| 20 | 4 | B |
| 40 | 1 | A |
| 50 | 11 | B |
| 60 | * 12 | C |

Table 4 illustrates that in order to ensure the good evaluation of crack bending, that is, in order to prevent cracks from reaching the internal electrodes of these samples, the second layer thickness needs to be within a range of 20 to 50 μm.

Sample 6 has an excessively small difference in thermal expansion coefficient; hence, the compressive stress applied to an outermost layer of this sample is insufficient to prevent cracks from reaching an internal electrode of this sample. In contrast, Sample 7 has an excessively large difference in thermal expansion coefficient; hence, the compressive stress applied to each outermost layer of this sample is too large and therefore cracks extend near an end face of the capacitor body of this sample. These cracks are caused to propagate toward an internal electrode of this sample by the stress applied from an outermost layer of this sample and reach an internal electrode.

Each outermost layer of Sample 8 has an excessively large thickness; hence, the compressive stress applied to this outermost layer is insufficient to prevent cracks from reaching an internal electrode of this sample. Each outermost layer of Sample 9 has a thickness that is insufficient for the cracks to bend; hence, these cracks propagate in the second layer next to this outermost layer to reach an internal electrode of this sample.

Each second layer of Sample 10 has an excessively small thickness; hence, the compressive stress applied to the outermost layer next to this second layer is insufficient to prevent cracks from reaching an internal electrode of this sample. Each second layer of Sample 12 has an excessively large thickness; hence, the compressive stress applied to the outermost layer next to this second layer is insufficient to prevent cracks from reaching an internal electrode of this sample.

Each outer section of Sample 14 has a single-layer structure, that is, Sample 14 has no means for stress relaxation; hence, cracks are readily formed in this sample. These cracks formed therein can reach internal electrodes of this sample because this sample has no means for controlling the propagation direction of these cracks.

Each outer section of Sample 15 also has a single-layer structure but has a lower thermal expansion coefficient than Sample 14. Sample 15 has a stress relaxation effect but cracks formed in this sample reached internal electrodes because this sample has no means for controlling the propagation direction of these cracks.

The invention claimed is:

1. A monolithic ceramic capacitor comprising:
    a capacitor body comprising:
        a capacitance-forming section including a plurality of internal electrodes and a plurality of dielectric ceramic layers, the internal electrodes and the dielectric ceramic layers being alternately arranged, and
        an outer layer section disposed on each of the upper or lower face of the capacitance-forming section;
    a first outer electrode; and
    a second outer electrode, the first and second outer electrodes being disposed on different and opposing surface portions of the capacitor body,
    wherein the internal electrodes comprise first internal electrodes and second internal electrodes, each first internal electrode and each second internal electrode being paired to form a capacitance therebetween, the first internal electrodes being electrically connected to the first outer electrode, the second internal electrodes being electrically connected to each second outer electrode, each outer layer section comprising an outermost layer and a second layer disposed internally of the outermost layer, the second layer having a thermal expansion coefficient greater than that of the outermost layer, the difference between the thermal expansion coefficient of the second layer and that of the outermost layer being $1\times 10^{-6}$/° C. to $3\times10^{-6}$/° C., the outermost layer having a thickness of 50 to 80 μm, and the second layer having a thickness of 20 to 50 μm.

2. The monolithic ceramic capacitor according to claim 1, wherein the second layer is disposed next to the capacitance-forming section.

3. A monolithic ceramic capacitor comprising:
    a capacitor body comprising:
        a capacitance-forming section including a plurality of internal electrodes and a plurality of dielectric ceramic layers, the internal electrodes and the dielectric ceramic layers being alternately arranged, and an outer layer section disposed on each of the upper or lower face of the capacitance-forming section;

a first outer electrode; and a second outer electrode, the first and second outer electrodes being disposed on different surface portions of the capacitor body, wherein the internal electrodes comprise first internal electrodes and second internal electrodes, each first internal electrode and each second internal electrode being paired to form a capacitance therebetween, the first internal electrodes being electrically connected to the first outer electrode, the second internal electrodes being electrically connected to each second outer electrode, each outer layer section comprising an outermost layer and a second layer disposed internally of the outermost layer, the second layer having a thermal expansion coefficient greater than that of the outermost layer, the difference between the thermal expansion coefficient of the second layer and that of the outermost layer being $1 \times 10^{-6}/°$ C. to $3 \times 10^{-6}/°$ C., the outermost layer having a thickness of 50 to 80 μm, and the second layer having a thickness of 20 to 50 μm, and wherein the outer layer sections each further comprise a third layer disposed between the second layer and the capacitance-forming section and wherein the third layer and the outermost layer are made of the same material.

4. The monolithic ceramic capacitor according to claim 3, wherein the outermost layer and the second layer are barium titanate dielectric ceramics and some of the Ba ions in one of the barium titanate dielectric ceramics are replaced with Ca ions.

5. The monolithic ceramic capacitor according to claim 4, wherein about 3 to 18 mol percent of the Ba ions in the second layer barium titanate dielectric ceramic are replaced with Ca ions.

6. The monolithic ceramic capacitor according to claim 5, wherein the difference between the thermal expansion coefficient of the second layer and that of the outermost layer is $2 \times 10^{-6}/°$ C. to $3 \times 10^{-6}/°$ C. and the second layer has a thickness of 20 to 40 μm and about 5 to 10 mol percent of the Ba ions in said second layer barium titanate dielectric ceramic are replaced with Ca ions.

7. A monolithic ceramic capacitor comprising:

a capacitor body comprising:

a capacitance-forming section including a plurality of internal electrodes and a plurality of dielectric ceramic layers, the internal electrodes and the dielectric ceramic layers being alternately arranged, and an outer layer section disposed on each of the upper or lower face of the capacitance-forming section;

a first outer electrode; and a second outer electrode, the first and second outer electrodes being disposed on different surface portions of the capacitor body, wherein the internal electrodes comprise first internal electrodes and second internal electrodes, each first internal electrode and each second internal electrode being paired to form a capacitance therebetween, the first internal electrodes being electrically connected to the first outer electrode, the second internal electrodes being electrically connected to each second outer electrode, each outer layer section comprising an outermost layer and a second layer disposed internally of the outermost layer, the second layer having a thermal expansion coefficient greater than that of the outermost layer, the difference between the thermal expansion coefficient of the second layer and that of the outermost layer being $1 \times 10^{-6}/°$ C. to $3 \times 10^{-6}/°$ C., the outermost layer having a thickness of 50 to 80 μm, and the second layer having a thickness of 20 to 50 μm, and wherein the outermost layer and the second layer are barium titanate dielectric ceramics and some of the Ba ions in one of the barium titanate dielectric ceramics are replaced with Ca ions.

8. The monolithic ceramic capacitor according to claim 7, wherein about 3 to 18 mol percent of the Ba ions in the second layer barium titanate dielectric ceramic are replaced with Ca ions.

9. The monolithic ceramic capacitor according to claim 8, wherein the difference between the thermal expansion coefficient of the second layer and that of the outermost layer is $2 \times 10^{-6}/°$ C. to $3 \times 10^{-6}/°$ C. and the second layer has a thickness of 20 to 40 μm and about 5 to 10 mol percent of the Ba ions in said second layer barium titanate dielectric ceramic are replaced with Ca ions.

10. A monolithic ceramic capacitor comprising:

a capacitor body comprising:

a capacitance-forming section including a plurality of internal electrodes and a plurality of dielectric ceramic layers, the internal electrodes and the dielectric ceramic layers being alternately arranged, and an outer layer section disposed on each of the upper or lower face of the capacitance-forming section;

a first outer electrode; and a second outer electrode, the first and second outer electrodes being disposed on different surface portions of the capacitor body, wherein the internal electrodes comprise first internal electrodes and second internal electrodes, each first internal electrode and each second internal electrode being paired to form a capacitance therebetween, the first internal electrodes being electrically connected to the first outer electrode, the second internal electrodes being electrically connected to each second outer electrode, each outer layer section comprising an outermost layer and a second layer disposed internally of the outermost layer, the second layer having a thermal expansion coefficient greater than that of the outermost layer, the difference between the thermal expansion coefficient of the second layer and that of the outermost layer being $1 \times 10^{-6}/°$ C. to $3 \times 10^{-6}/°$ C., the outermost layer having a thickness of 50 to 80 μm, and the second layer having a thickness of 20 to 50 μm, and wherein the outermost layer and the second layer are barium titanate dielectric ceramics and some of the Ba ions in one of the barium titanate dielectric ceramics are replaced with Ca ions.

11. The monolithic ceramic capacitor according to claim 10, wherein about 3 to 18 mol percent of the Ba ions in the second layer barium titanate dielectric ceramic are replaced with Ca ions.

12. The monolithic ceramic capacitor according to claim 11, wherein the difference between the thermal expansion coefficient of the second layer and that of the outermost layer is $2 \times 10^{-6}/°$ C. to $3 \times 10^{-6}/°$ C. and the second layer has a thickness of 20 to 40 μm and about 5 to 10 mol percent of the Ba ions in said second layer barium titanate dielectric ceramic are replaced with Ca ions.

* * * * *